M. L. WILLIAMS.
GAS ENGINE.
APPLICATION FILED OCT. 4, 1912. RENEWED SEPT. 10, 1917.
1,261,085.
Patented Apr. 2, 1918.
6 SHEETS—SHEET 5.
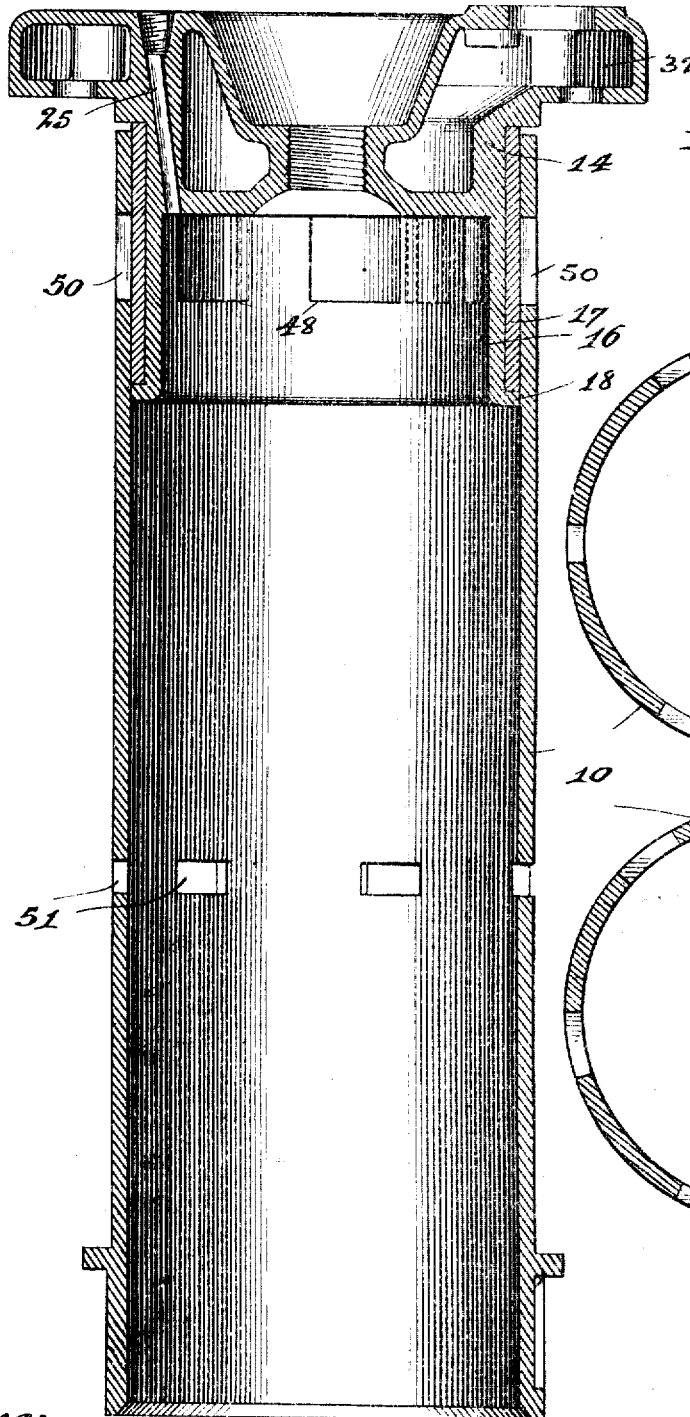
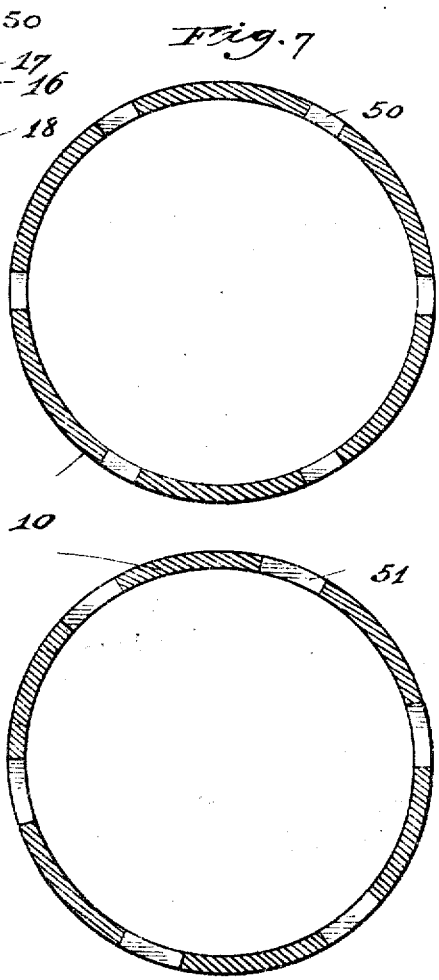
Fig. 6.
Fig. 7.
Fig. 8.
Witnesses,
Inventor:
Martin L. Williams
By Offield, Towle, Graves & Offield
Attys.

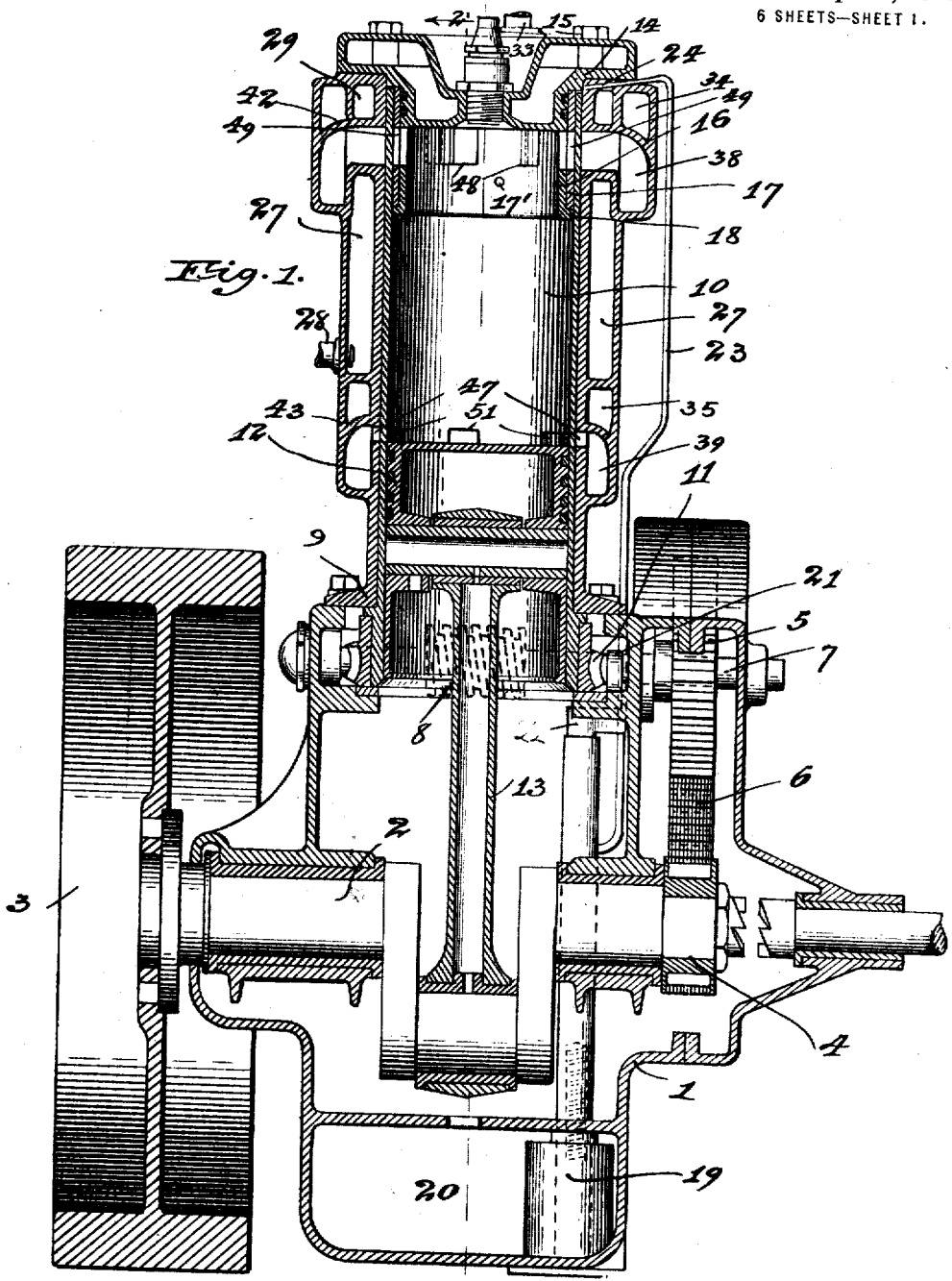

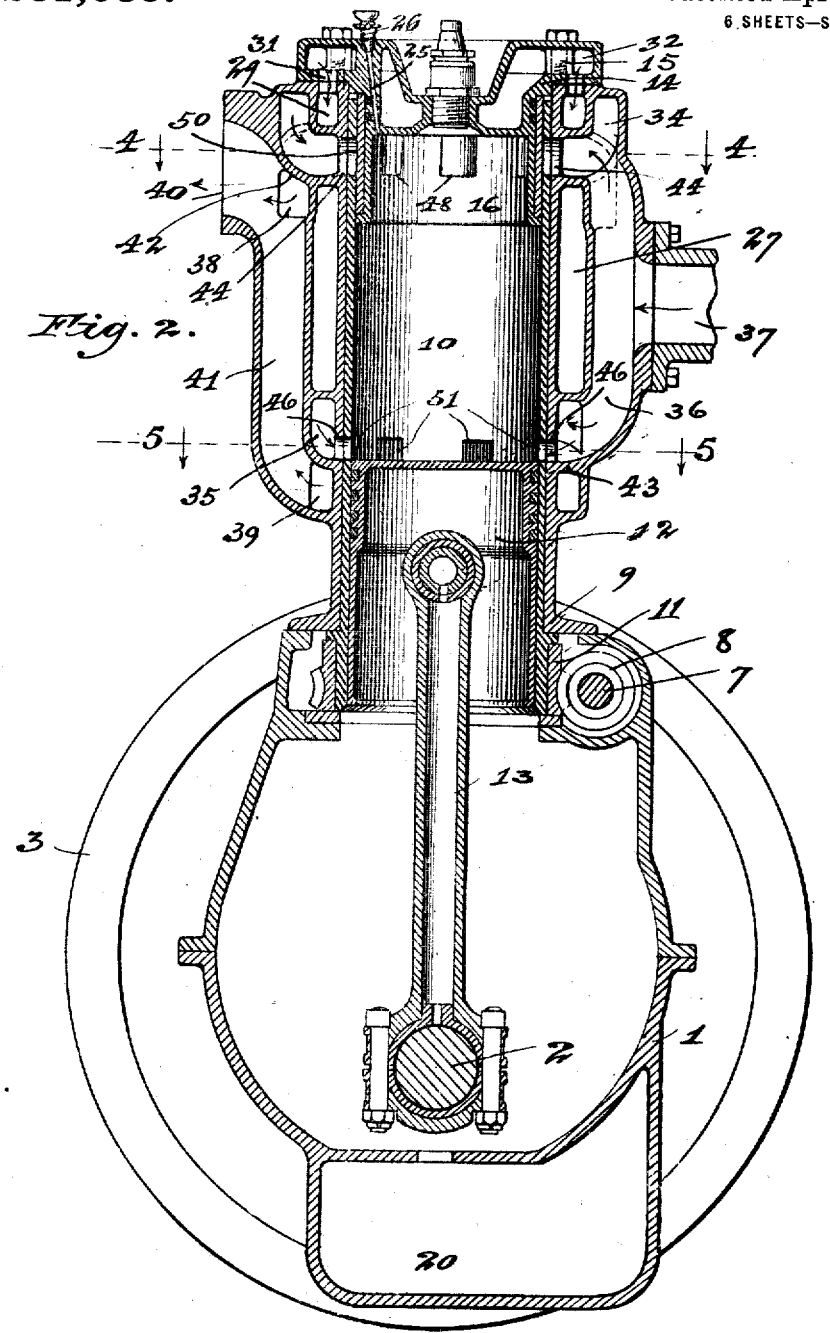

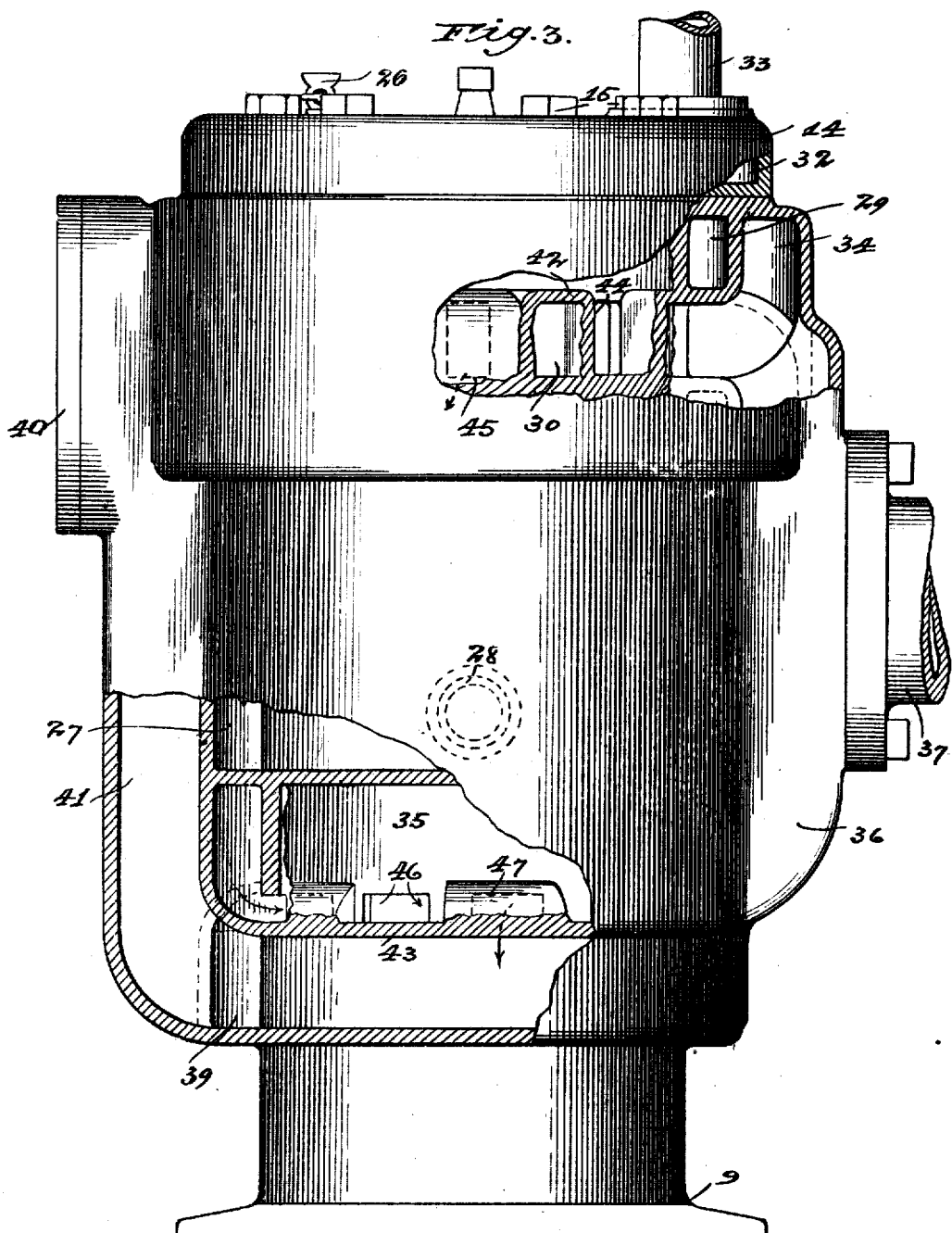

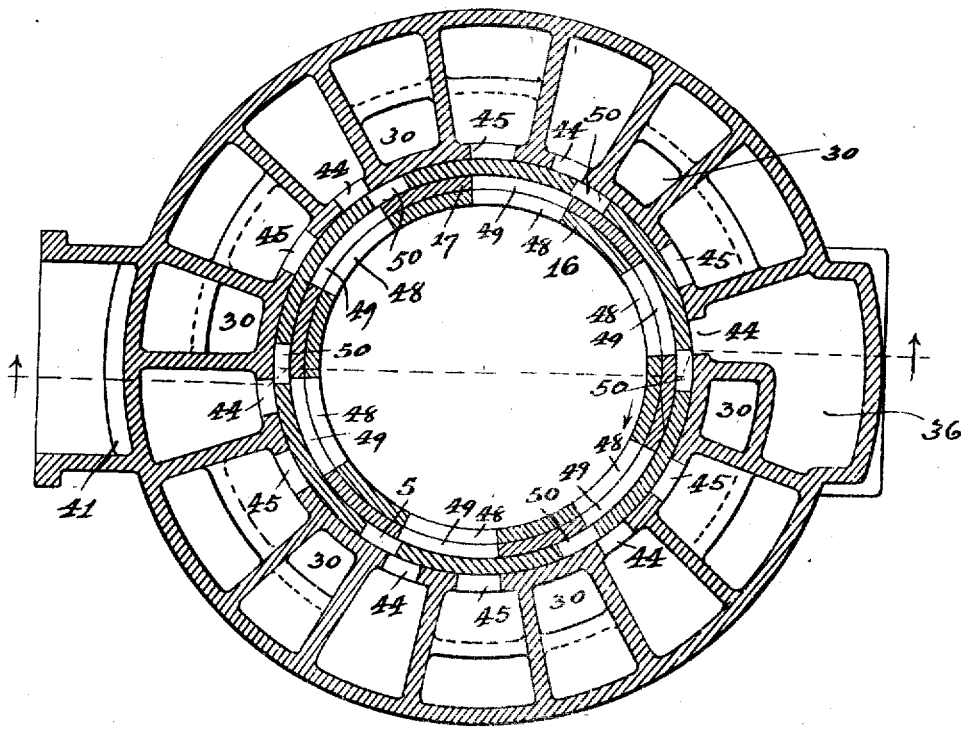
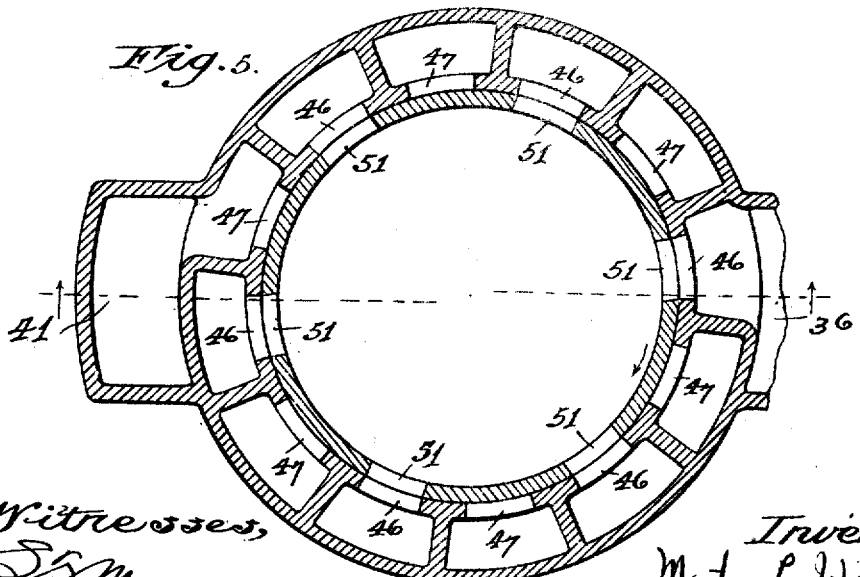

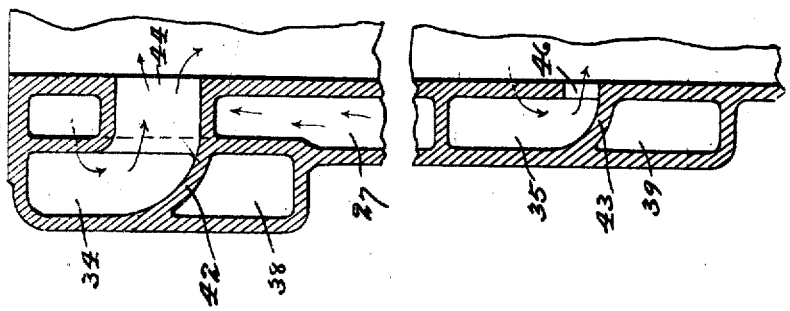
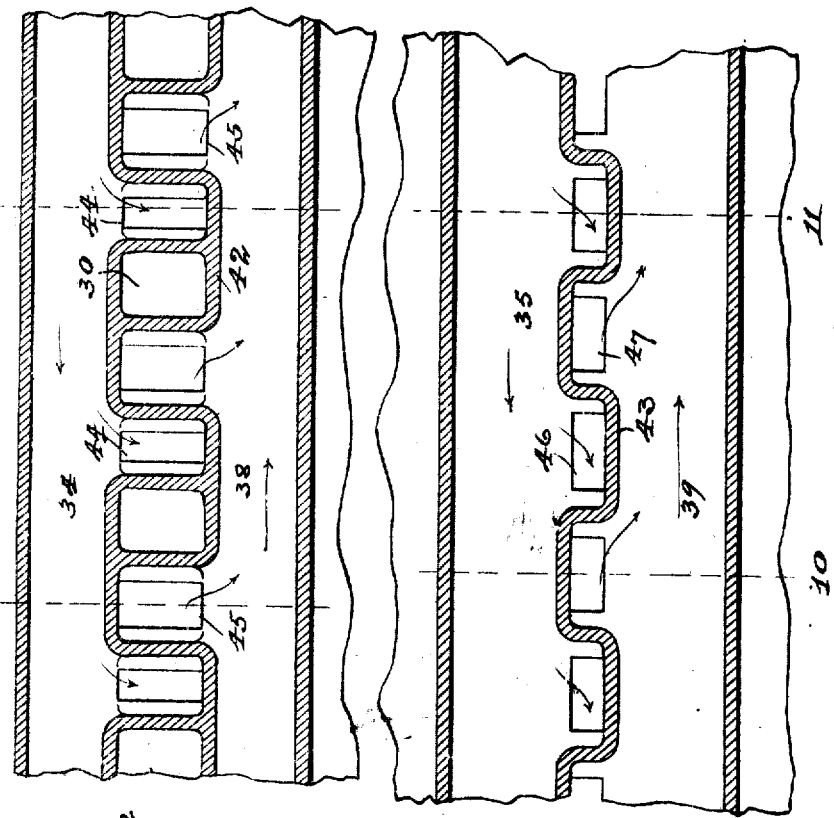
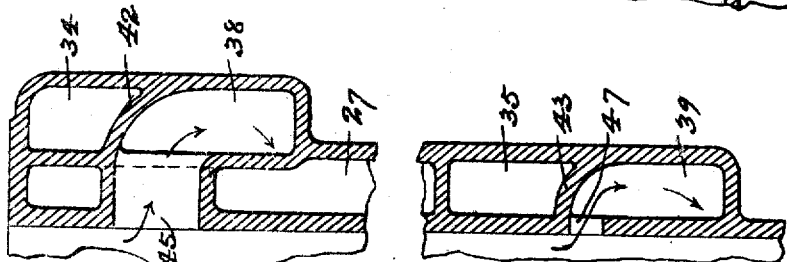

UNITED STATES PATENT OFFICE.

MARTIN L. WILLIAMS, OF SOUTH BEND, INDIANA, ASSIGNOR, BY MESNE ASSIGNMENTS, TO GILLETTE MOTORS COMPANY, OF CHICAGO, ILLINOIS, A CORPORATION OF WEST VIRGINIA.

GAS-ENGINE.

1,261,085.  Specification of Letters Patent.  Patented Apr. 2, 1918.

Application filed October 4, 1912, Serial No. 723,851.  Renewed September 10, 1917.  Serial No. 190,661.

*To all whom it may concern:*

Be it known that I, MARTIN L. WILLIAMS, a citizen of the United States, residing in the city of South Bend, county of St. Joseph, and State of Indiana, have invented certain new and useful Improvements in Gas-Engines, of which the following is a specification.

This invention relates to improvements in gas engines and refers more particularly to a four cycle gas engine of the single sleeve rotary valve type.

Among the salient objects of the invention are to provide a construction having a maximum port area at both ends of the cylinder; to provide a construction in which both the inlet and exhaust gases enter and leave the cylinder at either end of the latter; to provide a construction in which this maximum port area is obtained without unduly weakening the cylinder or sleeve walls; to provide a construction in which the inlet and exhaust ports are so distributed or arranged as to obtain a uniform temperature over the entire cylinder wall; to provide a construction in which the exhaust and inlet ports of both the cylinder and valve sleeve are symmetrically and alternately arranged so as to obtain a positive timing of the opening and closing of these ports relative to the piston stroke; to provide a construction in which the main inlet ports are arranged near the lower end of the cylinder and in which the supplementary inlet ports are arranged at the upper end of the cylinder, the latter serving to prevent an excessive vacuum pull on the intake stroke of the piston; to provide a construction in which the exhaust is at the lower end of the cylinder but in which a supplementary or scavenging exhaust is provided at the upper end of the cylinder; to provide in a construction of the character referred to novel means for strengthening the upper end of the cylinder and sleeve and which at the same time forms a gas tight joint in the cylinder head; to provide a construction in which the valve sleeve is driven directly and positively from the crank shaft; to provide a construction in which the driving mechanism is all concealed within the crank case and is at all times submerged in lubricating fluid; to provide a construction which is adapted for a wide variety of uses and in general to provide an improved construction of the character referred to.

The invention consists in the matters hereinafter described and more particularly pointed out in the appended claims.

In the drawings—

Figure 1 is a vertical sectional view of my improved gas engine;

Fig. 2 is a vertical sectional view taken on lines 2—2 of Fig. 1 and looking in the direction of the arrows;

Fig. 3 is a side elevation with parts broken away and showing in section the cylinder portions of the engine, the drawing being made on an enlarged scale;

Fig. 4 is a horizontal sectional view taken on lines 4—4 of Fig. 2 and looking in the direction of the arrows, the view being taken however on the scale shown in Fig. 3;

Fig. 5 is a similar sectional view taken on lines 5—5 of Fig. 2 and looking in the direction of the arrows; this view taken on the same scale as Fig. 4;

Fig. 6 is a vertical sectional view of the valve sleeve and detachable cylinder head.

Fig. 7 is a horizontal sectional view of the sleeve showing the ports at the upper end;

Fig. 8 is a similar view showing the ports at the lower end;

Fig. 9 is a fragmentary view of the cylinder laid out flat and showing more particularly the alternate arrangement of the inlet and exhaust ports;

Fig. 10 is a fragmentary vertical sectional view taken on lines 10—10 of Fig. 9 and showing more particularly the manner in which the gas passes into the exhaust chamber;

Fig. 11 is a view similar to Fig. 10 taken on lines 11—11 of Fig. 9 and showing the manner in which the gas enters the cylinder from the inlet chamber.

In Figs. 1 and 2, the piston is shown at the end of the intake stroke and in the remaining figures the parts are shown in the same relation.

Referring to the drawings—

1 designates as a whole the crank case, 2 the crank shaft, and 3 the balance wheel. On the crank shaft is mounted a spur gear 4 which is connected to another spur gear 5 by a chain drive 6. The gear 5 is mounted on a rotary shaft 7 journaled in suitable bearings in the upper end of the crank case. To the shaft 7 is fixed a worm gear 8. Around the upper end of the crank case is rigidly fixed a piston cylinder 9. Within this cylinder is mounted a rotary valve sleeve 10, in the lower end of which is fixed a worm gear 11. A piston 12 slides within the valve sleeve 10 and is secured to the crank shaft by means of a pitman 13 in the usual manner.

Within the upper end of the cylinder is seated a detachable cylinder head 14, the lower end of which fits within the valve sleeve 10. The cylinder head is rigidly secured to the cylinder by means of bolts 15. Between the sleeve wall and the cylinder extension 16 of the head is interposed a split sealing ring 17 which is locked to the cylinder head by a pin 17'. The lower end of the cylinder head extension 16 is provided with a flange 18 to hold the split ring 17 in position.

In order to oil or lubricate the bearing parts of the cylinder I provide an oil pump 19 which is seated in an oil reservoir 20 in the lower end of the crank case. This pump is driven from the worm shaft 7 by means of an eccentric 21 and pump rod 22. Oil is delivered from the pump 19 to a supply pipe 23 which leads to the upper end of the cylinder as shown at 24. The upper end of the cylinder head is provided with a passage way 25 to communicate with the compression pump of the cylinder (not shown). In the upper end of this passage way is seated a compression release cock 26.

The cylinder wall is surrounded by a water jacket 27. Water enters through a supply pipe connection in the lower end of the water jacket, passes around the cylinder wall and thence into an annular chamber 29. The water passes from the water jacket to the annular chamber 29 by means of a series of passage ways or conduits 30, 30 formed in the cylinder. From the annular chamber 29 the water passes through ports 31 into a second water chamber 32 formed in the cylinder head. A delivery or discharge pipe 33 is connected to the second water jacket 32.

Around the cylinder wall is formed a pair of annular inlet chambers 34 and 35, at the upper and lower ends of the cylinder walls respectively. Gas is delivered to these chambers by means of an inlet manifold 36 which connects with a main inlet pipe 37. Around the cylinder is also formed a pair of annular exhaust chambers 38 and 39 respectively. These chambers are arranged immediately beneath the inlet chambers 34 and 35 respectively. The exhaust gases from these chambers 38 and 39 pass to a main exhaust passage 40 by means of a manifold 41. The upper inlet and exhaust passages 34 and 38 are divided by a staggered partition wall 42 which is shown laid out flat in the upper portion of Fig. 9. This partition wall is staggered, or provided with alternate offset portions in order to cause the exhaust and inlet ports hereinafter described to register with the respective inlet and exhaust chambers. It will be noted that the passage ways 30, 30 between the water jacket and water chamber 29 pass through this partition or bridge wall 42. The lower inlet chamber 35 and exhaust chamber 39 are similarly divided by a staggered partition wall 43 shown laid out flat in the lower part of Fig. 9. This partition wall 43 does not however, have any water passage ways through it as does the upper bridge wall 42.

Describing now the port arrangement in the cylinder wall, the upper end of this wall is provided with a series of circumferentially extending inlet ports 44 and exhaust ports 45, these ports being alternately arranged as shown in the drawings. In the present instance there are six of these inlet ports and six exhaust ports at the upper end of the cylinder. The lower end of the cylinder is similarly provided with the same number of inlet ports 46 and exhaust ports 47. It will be noted however, that both of the inlet and exhaust ports at the upper end of the cylinder are longer vertically than horizontally while both the inlet and exhaust ports at the lower end of the cylinder are longer horizontally than vertically. It is also to be noted that the inlet ports at the upper end of the cylinder are narrower than the upper exhaust ports for a purpose hereinafter described. The exhaust and inlet ports at the bottom of the cylinder are however of the same size.

The annular extension 16 of the cylinder head and the split ring 17 are each provided with six ports 48 and 49 respectively. These ports 48 and 49 are vertically of the same length as the ports in the cylinder, and of sufficient width horizontally to bridge the adjacent inlet and exhaust ports in the cylinder wall. Inasmuch as the head and ring do not move, these ports 48 and 49 are at all times in fixed relation to the ports in the cylinder wall.

Describing now the ports in the rotary valve sleeve at the upper end, the sleeve is provided with six circumferentially extending ports 50, 50, these ports being spaced apart equi-distant, as shown in Fig. 7. These ports 50 are of the same height and width as the exhaust ports 45 in the upper end of the cylinder. The lower end of the sleeve is provided with a series of circumferentially extending and equi-spaced apart ports 51 which are of the same height and width as the inlet and exhaust ports in the lower end of the cylinder. It will be noted that the ports in the upper end of the sleeve are off-set, or in other words, do not lie in the same vertical plane as the ports in the lower end of the sleeve.

The arrangement of these ports is such that all of the ports in the upper end of the sleeve simultaneously register with all of the inlet ports in the upper end of the cylinder, and the same is true with reference to the exhaust ports in the upper end of the cylinder. In exactly the same manner the ports in the lower end of the sleeve simultaneously register with either the inlet or exhaust ports in the lower end of the cylinder. The sleeve is geared to the crank shaft by a one to twelve reduction, in other words, the sleeve will rotate one hundred times while the crank shaft is making twelve hundred rotations. Accordingly, the sleeve makes one twenty fourth of a revolution while the piston travels from the top to the bottom of the cylinder or vice versa.

Describing now the operation of the device, as the piston starts down on the first intake stroke, the ports in the upper end of the sleeve register with the inlet ports in the upper end of the cylinder, and a relatively small amount of gas rushes into the cylinder. At this time the exhaust ports at the upper end of the cylinder are closed. The lower ports are of course, closed by the piston. As the piston descends on the intake stroke it creates a vacuum drawing in the gas through the upper inlet port. These upper inlet ports are however, not sufficiently large to let a full charge of gas enter the cylinder. As the piston reaches the end of its intake stroke it uncovers the lower inlet ports and the main charge of gas rushes into the cylinder by reason of the vacuum created on the intake stroke. The revolutions of the sleeve are so timed relative to the crank shaft that the ports at the lower end of the sleeve register with the ports at the lower end of the cylinder as the piston approaches the end of its intake stroke. As the piston starts up on the compression stroke it covers the ports in the lower end of the cylinder. At this time the sleeve has rotated sufficiently to cover both the inlet and exhaust ports in the upper end of the cylinder. The sleeve is so arranged that these ports will remain closed not only during the entire compression stroke but during the entire power stroke. As the piston approaches the end of the power stroke the sleeve has rotated so that its lower ports register with the exhaust ports in the lower end of the cylinder while the inlet ports in the lower end of the cylinder are closed. As the piston covers the lower exhaust ports on the upward exhaust stroke the upper exhaust ports are uncovered by the sleeve, and remain uncovered during the remainder of the scavenging stroke of the piston. During this stroke the inlet ports at the top of the cylinder are closed. On the next stroke or intake of the piston the upper inlet ports are uncovered and the upper exhaust ports are closed and the cycle takes place as before.

The invention is not limited to the details of construction except as set forth in the appended claims.

I claim as my invention:

1. In a four cycle gas engine the combination with a cylinder having a series of circumferentially disposed and equi-spaced apart inlet ports at its upper and lower ends and similarly arranged exhaust ports alternately disposed relative to the inlet ports, a rotary valve sleeve within said cylinder and having a series of ports at its upper and lower ends coöperating with said cylinder ports, a piston moving in said sleeve and means for driving said piston and sleeve in properly timed relation.

2. In a four cycle gas engine, the combination with a cylinder, having a series of laterally disposed and alternately arranged inlet and exhaust ports at its upper and lower ends respectively, a rotary valve sleeve extending within said cylinder and provided at its upper and lower ends with ports coöperating with said cylinder ports, a crank case, a crank shaft mounted in said case, a piston reciprocating in said sleeve, a pitman connecting said crank shaft and piston and gearing inclosed within said case for driving said sleeve from the crank shaft.

3. In a four cycle gas engine, the combination with a cylinder having a plurality of alternately arranged inlet and exhaust ports at both its upper and lower ends, a rotary valve sleeve within said cylinder and having ports at its upper and lower ends coöperating with said cylinder ports, an annular inlet and exhaust chamber at each end of the cylinder communicating with the respective inlet and exhaust ports, a piston reciprocating in said sleeve and means for actuating said piston and sleeve in timed relation.

4. In a four cycle gas engine, the combination with a cylinder having a plurality of alternately arranged inlet and exhaust ports at both its upper and lower ends, a rotary valve sleeve within said cylinder and having ports at its upper and lower ends coöperating with said cylinder ports, an annular inlet and exhaust chamber communicating with the respective inlet and exhaust ports at the end of the cylinder, manifolds connecting the respective inlet and exhaust chambers, a piston reciprocating in said sleeve, a crank shaft, a pitman connecting said piston and crank shaft and reduction gearing driven from the crank shaft for rotating said sleeve in timed relation relative to the piston.

5. In a four-cycle gas engine, the combination with a cylinder provided at its upper end with inlet and with exhaust ports, and at its lower end with inlet and exhaust ports, a gas supply chamber communicating with said inlet ports and an exhaust chamber communicating with said exhaust ports, whereby live gas is supplied to either end of the cylinder, and the gases escape from either end of said cylinder, a piston reciprocating in said cylinder, a rotary valve sleeve having ports at either end controlling said inlet and exhaust ports, of the cylinder, and means for actuating said piston and rotating said sleeve in properly timed relation.

6. In a four cycle gas engine, the combination with a cylinder having a series of alternately disposed inlet and exhaust ports at its upper and lower ends, a rotary valve sleeve seated within said cylinder and having ports coöperating with said cylinder ports, a piston reciprocating in said sleeve, means for actuating said piston, means for rotating said sleeve in positive relation relative to the stroke of the piston, said sleeve and cylinder ports being so arranged that the cylinder is charged and exhausts mainly through the lower inlet and exhaust ports of the cylinder.

7. In a four-cycle gas engine, the combination with a cylinder provided at its upper end with inlet and with exhaust ports, and at its lower end with inlet and exhaust ports, the inlet ports at the upper end of the cylinder being staggered or offset relative to the inlet ports at the lower end of the cylinder and the exhaust ports being similarly arranged, a supply chamber communicating with said inlet ports and an exhaust chamber communicating with said exhaust ports, whereby live gas is supplied to either end of the cylinder, and the gases escape from either end of said cylinder, a piston reciprocating in said cylinder, a rotary valve sleeve having ports at either end controlling said inlet ports and exhaust ports of the cylinder, and means for actuating said piston and rotating said sleeve in properly timed relation.

8. In a four-cycle gas engine, the combination with a cylinder having a plurality of inlet and a plurality of exhaust ports at each end, a gas supply chamber communicating with said inlet ports, a discharge chamber communicating with said exhaust ports, a piston reciprocating in said cylinder, a rotary valve sleeve surrounding said piston and having ports at its upper and lower ends, said ports being common to both the inlet and exhaust ports at the respective ends of the cylinder and means for actuating said sleeve and piston in timed relation.

9. In a four cycle gas engine, the combination with a cylinder having a plurality of inlet and exhaust ports at each end, annular inlet and exhaust chambers surrounding said ports, staggered partition walls dividing said chambers whereby the inlet ports communicate with the inlet chambers and the exhaust ports with the exhaust chambers, a valve sleeve rotating in said cylinder and having ports coöperating with said cylinder ports, a piston reciprocating in said sleeve and means for actuating said piston and sleeve in properly timed relation relative to each other.

10. In a four-cycle gas engine, the combination with a cylinder, having a series of alternately disposed inlet and exhaust ports at each end of the cylinder, a gas supply chamber communicating with the inlet ports at each end of the cylinder, a discharge chamber communicating with the exhaust ports at each end of the cylinder, a piston reciprocating in said cylinder, a rotary valve sleeve having ports at each end of the cylinder adapted to register with the inlet and exhaust ports in said cylinder, the upper inlet ports of the cylinder being offset or staggered relative to the lower inlet ports, and the exhaust ports being similarly arranged and means for actuating said piston and rotating said sleeve in timed relation.

11. In a four cycle gas engine, the combination with a cylinder having a plurality of inlet and exhaust ports at the upper end of the cylinder, and a plurality of inlet and exhaust ports at the lower end of said cylinder, an annular sleeve rotating in said cylinder and having ports coöperating with the ports in the cylinder, a head secured to the upper end of the cylinder and having an annular extension fitting within said sleeve and a split sealing ring interposed between said annular extension and head, said extension and ring having ports communicating with the adjacent ports of the cylinder, a piston reciprocating in said sleeve and means for actuating said piston and rotating said sleeve in properly timed relation relative to each other.

12. In a four-cycle gas engine, the combination with a cylinder provided adjacent its lower end with main inlet and main exhaust ports, and adjacent its upper end with supplemental inlet and exhaust ports, a supply chamber communicating with said inlet ports for supplying live gas to the cylinder and an exhaust chamber communicating with said exhaust ports, a rotary valve sleeve having ports at each end coöperating with said cylinder ports, a piston in said cylinder, and means for rotating said sleeve and actuating said piston in properly timed relation.

13. In a four-cycle gas engine, the combination with a cylinder having a series of alternately disposed main inlet and main exhaust ports at its lower end and a series of similarly disposed supplemental inlet and exhaust ports at its upper end, a piston in said cylinder, a rotary valve sleeve interposed between the outer wall of the piston and inner wall of the cylinder, said sleeve having ports at its upper and lower ends and adapted to register with the respective inlet and exhaust ports of the cylinder, a crank casing, a crank within said casing, means for connecting said piston to the crank and reduction gearing for connecting the lower end of said sleeve to said crank whereby said piston and sleeve are operated in positive timed relation.

14. In a gas engine, the combination with a cylinder having at each end a plurality of circumferentially extending inlet ports and a plurality of similarly arranged exhaust ports alternately disposed relatively to said inlet ports and all arranged in pairs spaced equidistant apart, a rotary valve sleeve provided at each end with a series of coöperating ports equal in number to one-half the combined number of inlet and discharge ports at the adjacent end of the cylinder, a piston in said cylinder and means for actuating said piston and rotating said sleeve in timed relation.

15. In a gas engine, the combination with a cylinder having a series of circumferentially disposed and equi-spaced apart inlet ports at its upper end and similarly arranged exhaust ports alternately disposed relative to the inlet ports, and a series of circumferentially disposed and equi-spaced apart exhaust ports at its lower end, a ported rotary valve sleeve controlling said ports, a piston moving in said sleeve, and means for driving said piston and sleeve in properly timed relation.

16. In a gas engine, the combination with a cylinder having a plurality of alternately arranged inlet and exhaust ports at its upper end and a series of exhaust ports at its lower end, a rotary valve sleeve having ports at its upper and lower ends coöperating with said cylinder ports, a piston reciprocating in relation to said sleeve, and means for actuating said piston and sleeve in timed relation.

MARTIN L. WILLIAMS.

Witnesses:
EDWARD H. WILLIAMS,
J. G. WIGGINS.